United States Patent
Sanan et al.

(10) Patent No.: US 10,540,158 B2
(45) Date of Patent: Jan. 21, 2020

(54) POST-INSTALL APPLICATION INTERACTION

(71) Applicant: Google LLC, Mountain View, CA (US)

(72) Inventors: Shibani Sanan, Saratoga, CA (US); Christopher K. Harris, Santa Clara, CA (US); Nicola Rettke, Belvedere Tiburon, CA (US); Sissie Ling-le Hsiao, Los Altos, CA (US); Samuel Sze Ming Ieong, Mountain View, CA (US); Vinod Kumar Ramachandran, Sunnyvale, CA (US); Anthony Chavez, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/642,994

(22) Filed: Jul. 6, 2017

(65) Prior Publication Data
US 2018/0018155 A1    Jan. 18, 2018

Related U.S. Application Data

(60) Provisional application No. 62/363,680, filed on Jul. 18, 2016.

(51) Int. Cl.
G06F 9/445 (2018.01)
G06F 9/44 (2018.01)
G06F 8/61 (2018.01)

(52) U.S. Cl.
CPC .................... G06F 8/61 (2013.01)

(58) Field of Classification Search
CPC ...... G06F 8/654; G06F 9/445; B61L 15/0027; B61L 15/0072; H04L 41/082; H04L 67/12
See application file for complete search history.

(56) References Cited

U.S. PATENT DOCUMENTS 8,136,090 B2 * 3/2012 Boss .................. G06F 9/44505
717/120
8,180,688 B1    5/2012 Velummylum et al.
(Continued)

OTHER PUBLICATIONS

International Search Report and Written Opinion issued in International Application No. PCT/US2017/041876, dated Oct. 27, 2017, 16 pages.
(Continued)

Primary Examiner — Jae U Jeon
(74) Attorney, Agent, or Firm — Fish & Richardson P.C.

(57) ABSTRACT

Methods, systems, and apparatus include computer programs encoded on a computer-readable storage medium, including a method for providing content. Data specifying a post-install activity is received from a provider of an application. An opportunity is identified to provide third-party content to a user. A likelihood is determined that the user will perform the specified post-install activity based on one or more attributes of the user and attributes of users that have previously performed the specified post-install activity in the application. A selection value is adjusted for third-party content that identifies the application based on the determined likelihood, wherein the selection value increases as the likelihood increases. The third-party content identifying the application is selected based on the adjusted selection value. The third-party content identifying the application is distributed to a client device of the user.

15 Claims, 7 Drawing Sheets

(56) References Cited

U.S. PATENT DOCUMENTS

| | | | | |
|---|---|---|---|---|
| 8,655,730 | B1* | 2/2014 | Swan | G06Q 30/0242 |
| | | | | 705/14.53 |
| 9,167,404 | B1 | 10/2015 | Freed et al. | |
| 9,922,333 | B2* | 3/2018 | Saldanha | G06Q 30/02 |
| 2009/0144700 | A1* | 6/2009 | Huff | G06F 9/44505 |
| | | | | 717/121 |
| 2011/0295695 | A1* | 12/2011 | Ishihara | G06Q 30/0269 |
| | | | | 705/14.66 |
| 2012/0284128 | A1* | 11/2012 | Wang | G06Q 30/00 |
| | | | | 705/14.71 |
| 2014/0019228 | A1* | 1/2014 | Aggarwal | G06Q 30/0244 |
| | | | | 705/14.43 |
| 2014/0164141 | A1* | 6/2014 | Matus | G06Q 50/01 |
| | | | | 705/14.68 |
| 2014/0278927 | A1* | 9/2014 | Close | G06Q 30/0246 |
| | | | | 705/14.45 |

OTHER PUBLICATIONS

Costa-Montenegro et al. "Which App? A recommender system of applications in markets: Implementation of the service for monitoring users interaction," Expert Systems with Applications vol. 39(10), Aug. 31, 2012, 9 pages.

Written Opinion issued in International Application No. PCT/US2017041876, dated Jun. 8, 2018, 7 pages.

International Preliminary Report on Patentability issued in International Application No. PCT/US2017/041876, dated Jan. 31, 2019, 9 pages.

\* cited by examiner

POST-INSTALL APPLICATION INTERACTION

CROSS-REFERENCE TO RELATED APPLICATION

This application claims priority to U.S. Provisional Application No. 62/363,680, filed on Jul. 18, 2016. The disclosure of the prior application is considered part of and is incorporated by reference in the disclosure of this application.

BACKGROUND

This specification relates to selection of content related to applications.

The Internet provides access to a wide variety of resources. For example, video and/or audio files, as well as webpages for particular subjects or particular news articles, are accessible over the Internet. Access to these resources presents opportunities for third-party content to be provided with the resources. For example, a webpage can include slots in which content can be presented.

SUMMARY

In general, one innovative aspect of the subject matter described in this specification can be implemented in methods that include receiving, from a provider of an application and by one or more servers, data specifying a post-install activity; identifying, by the one or more servers, an opportunity to provide third-party content to a user; determining, by the one or more servers, a likelihood that the user will perform the specified post-install activity based on one or more attributes of the user and attributes of users that have previously performed the specified post-install activity in the application; adjusting, by the one or more servers, a selection value for third-party content that identifies the application based on the determined likelihood, wherein the selection value increases as the likelihood increases; selecting, by the one or more servers, the third-party content identifying the application based on the adjusted selection value; and distributing, by the one or more servers, the third-party content identifying the application to a client device of the user.

These and other implementations can each optionally include one or more of the following features. Receiving data specifying a post-install activity can include receiving data specifying one or more user interactions with the application that are capable of being performed. Receiving data specifying a post-install activity can include receiving data specifying a target level of gain, including one of a spend level or a profit level, to be obtained following install of the application. Determining the likelihood that the user will perform the specified post-install activity can include accessing historical user activity data specifying prior user activity within the application; accessing user attributes of users that performed the specified post-install activity; generating a model that provides a likelihood the user will perform the specified post-install activity after install of the application by the user; and applying the model to the one or more attributes of the user to obtain the likelihood. Determining the likelihood that the user will perform the specified post-install activity can include accessing historical user activity data specifying prior gain obtained through interaction within the application; accessing user attributes of users that interacted with the application; generating a model that provides an estimated gain that will be obtained from the user through interaction with the application after install of the application by the user; and applying the model to the one or more attributes of the user to obtain the estimated gain that will be obtained from the user. The method can further include providing, to the provider, a user interface that is populated with a set of post-install activities that the provider is tracking, wherein receiving data specifying a post-install activity comprises detecting provider interaction with one or more of the set of post-install activities presented in the user interface.

In general, another aspect of the subject matter described in this specification can be implemented a non-transitory computer storage medium encoded with a computer program. The program can include instructions that when executed by a distributed computing system cause the distributed computing system to perform operations including receiving, from a provider of an application and by one or more servers, data specifying a post-install activity; identifying, by the one or more servers, an opportunity to provide third-party content to a user; determining, by the one or more servers, a likelihood that the user will perform the specified post-install activity based on one or more attributes of the user and attributes of users that have previously performed the specified post-install activity in the application; adjusting, by the one or more servers, a selection value for third-party content that identifies the application based on the determined likelihood, wherein the selection value increases as the likelihood increases; selecting, by the one or more servers, the third-party content identifying the application based on the adjusted selection value; and distributing, by the one or more servers, the third-party content identifying the application to a client device of the user.

These and other implementations can each optionally include one or more of the following features. Receiving data specifying a post-install activity can include receiving data specifying one or more user interactions with the application that are capable of being performed. Receiving data specifying a post-install activity can include receiving data specifying a target level of gain, including one of a spend level or a profit level, to be obtained following install of the application. Determining the likelihood that the user will perform the specified post-install activity can include accessing historical user activity data specifying prior user activity within the application; accessing user attributes of users that performed the specified post-install activity; generating a model that provides a likelihood the user will perform the specified post-install activity after install of the application by the user; and applying the model to the one or more attributes of the user to obtain the likelihood. Determining the likelihood that the user will perform the specified post-install activity can include accessing historical user activity data specifying prior gain obtained through interaction within the application; accessing user attributes of users that interacted with the application; generating a model that provides an estimated gain that will be obtained from the user through interaction with the application after install of the application by the user; and applying the model to the one or more attributes of the user to obtain the estimated gain that will be obtained from the user. The operations can further include providing, to the provider, a user interface that is populated with a set of post-install activities that the provider is tracking, wherein receiving data specifying a post-install activity comprises detecting provider interaction with one or more of the set of post-install activities presented in the user interface.

In general, another aspect of the subject matter described in this specification can be implemented in systems that include one or more processing devices and one or more storage devices. The storage devices store instructions that, when executed by the one or more processing devices, cause the one or more processing devices to perform operations including: receiving, from a provider of an application and by one or more servers, data specifying a post-install activity; identifying, by the one or more servers, an opportunity to provide third-party content to a user; determining, by the one or more servers, a likelihood that the user will perform the specified post-install activity based on one or more attributes of the user and attributes of users that have previously performed the specified post-install activity in the application; adjusting, by the one or more servers, a selection value for third-party content that identifies the application based on the determined likelihood, wherein the selection value increases as the likelihood increases; selecting, by the one or more servers, the third-party content identifying the application based on the adjusted selection value; and distributing, by the one or more servers, the third-party content identifying the application to a client device of the user.

These and other implementations can each optionally include one or more of the following features. Receiving data specifying a post-install activity can include receiving data specifying one or more user interactions with the application that are capable of being performed. Receiving data specifying a post-install activity can include receiving data specifying a target level of gain, including one of a spend level or a profit level, to be obtained following install of the application. Determining the likelihood that the user will perform the specified post-install activity can include accessing historical user activity data specifying prior user activity within the application; accessing user attributes of users that performed the specified post-install activity; generating a model that provides a likelihood the user will perform the specified post-install activity after install of the application by the user; and applying the model to the one or more attributes of the user to obtain the likelihood. Determining the likelihood that the user will perform the specified post-install activity can include accessing historical user activity data specifying prior gain obtained through interaction within the application; accessing user attributes of users that interacted with the application; generating a model that provides an estimated gain that will be obtained from the user through interaction with the application after install of the application by the user; and applying the model to the one or more attributes of the user to obtain the estimated gain that will be obtained from the user. The operations can further include providing, to the provider, a user interface that is populated with a set of post-install activities that the provider is tracking, wherein receiving data specifying a post-install activity comprises detecting provider interaction with one or more of the set of post-install activities presented in the user interface.

Particular implementations may realize none, one or more of the following advantages. Application providers who distribute applications ("apps") can use predicted post-download activity as a basis for identifying specific types of users that will perform a specified interaction following app installs/downloads. A machine learning system can enable distribution of information about an application (e.g., a download link) over multiple different online platforms (e.g., search, video, social networks, publisher pages, and/or streaming content platforms) using a same set of post-download user interactions as the basis for the distribution. For example, the machine learning system can automatically determine a likelihood that a given user will perform a specified post-download activity (e.g., reaching a certain level of a game application or utilizing an application a given number of times post-download) based on characteristics of a user and characteristics of other users that have previously performed the specific post-download activity.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for responding to a request for content based on a likelihood of one or more specific user interactions occurring within an application following a user download of the application. For example, an application provider can specify one or more post-install user interactions, and a machine learning system (e.g., a model created using machine learning) can output a prediction regarding a likelihood that a specific user will perform the post-download user interaction within the downloaded application or an amount of gain that will be provided by the user. As used throughout this document, the term gain refers to an increased value.

Figure 1:
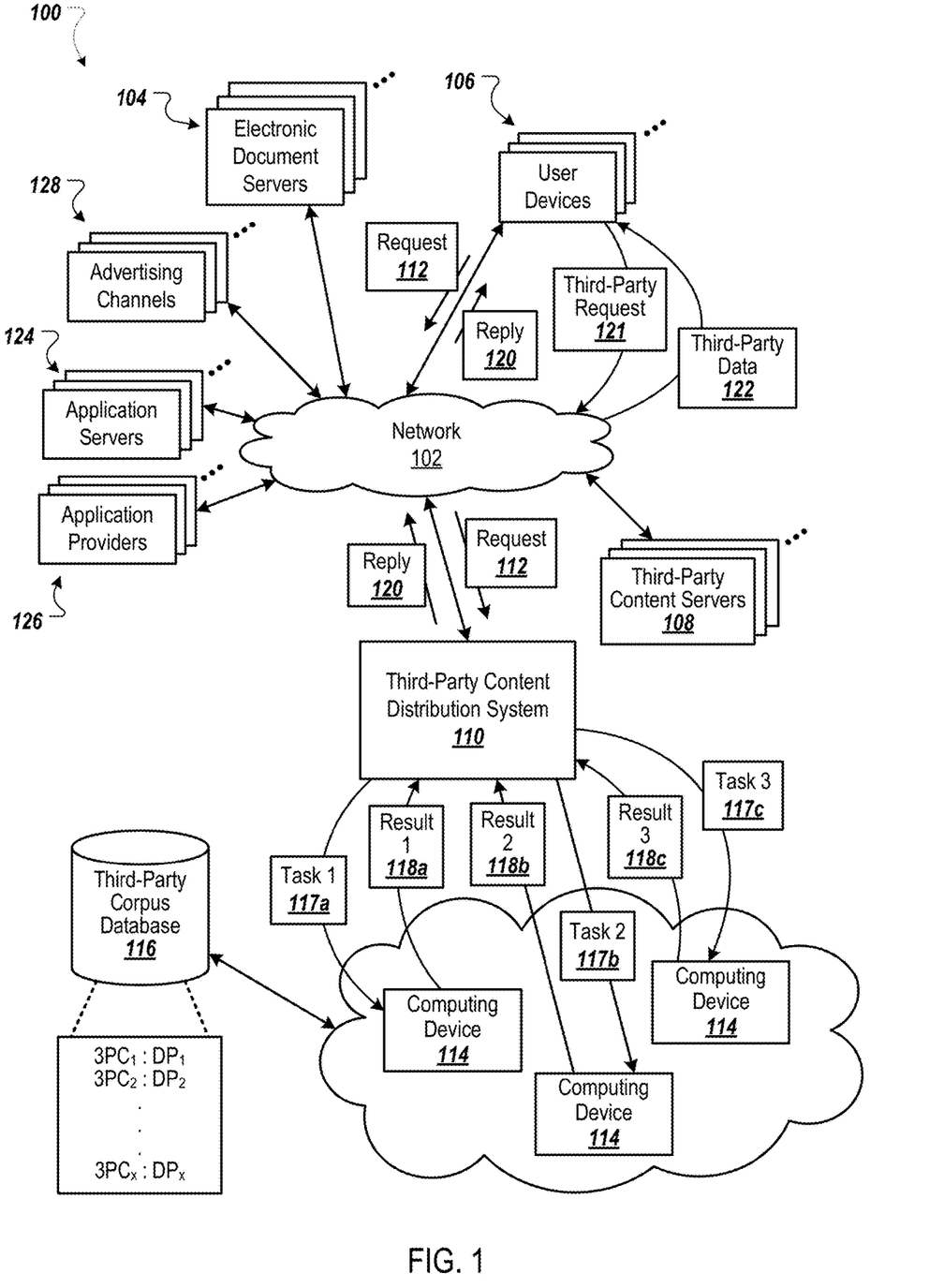
FIG. 1 is a block diagram of an example environment in which third-party content is distributed for presentation with electronic documents.

FIG. 1 is a block diagram of an example environment 100 in which third-party content is distributed for presentation with electronic documents. The example environment 100 includes a network 102, such as a local area network (LAN), a wide area network (WAN), the Internet, or a combination thereof. The network 102 connects electronic document servers 104, user devices 106, third-party content servers 108, and a third-party content distribution system 110 (also referred to as a content distribution system). The example environment 100 may include many different electronic document servers 104, user devices 106, and third-party content servers 108. In some implementations, the environment 100 includes application servers 124 (e.g., app stores), e.g., that provide applications (or "apps") that are available for downloading and/or use. For example, the apps may be provided by application providers 126. Advertisements for the applications can be provided over plural advertising channels 128, e.g., that serve search systems, video sites, social network systems, and other systems.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine executable instructions that initiate presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a third-party tag or third-party script (e.g., portion of code) that references the third-party content distribution system 110. In these situations, the third-party tag or third-party script is executed by the user device 106 when the given electronic document is processed by the user device 106. Execution of the third-party tag or third-party script configures the user device 106 to generate a request 112 for third-party content, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The request 112 can include data specifying the electronic document and characteristics of locations at which third-party content can be presented. For example, data specifying a reference (e.g., URL) to an electronic document (e.g., webpage) in which the third-party content will be presented, available locations (e.g., third-party content slots) of the electronic documents that are available to present third-party content, sizes of the available locations, positions of the available locations within a presentation of the electronic document, and/or media types that are eligible for presentation in the locations can be provided to the third-party content distribution system 110. Similarly, data specifying keywords associated with the electronic document ("document keywords") or entities (e.g., people, places, or things) that are referenced by the electronic document can also be included in the request 112 (e.g., as payload data) and provided to the third-party content distribution system 110 to facilitate identification of third-party content items that are eligible for presentation with the electronic document.

Requests 112 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Data specifying characteristics of the user device 106 can also be provided in the request 112, such as information that identifies a model of the user device 106, a configuration of the user device 106, or a size (e.g., physical size or resolution) of an electronic display (e.g., touchscreen or desktop monitor) on which the electronic document is presented. Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 selects third-party content (e.g., information about apps) that will be presented with the given electronic document in response to receiving the request 112 and/or using information included in the request 112. In some implementations, the third-party content is selected in less than a second to avoid errors that could be caused by delayed selection of the third-party content. For example, delays in providing third-party content in response to a request 112 can result in page load errors at the user device 106 or cause portions of the electronic document to remain unpopulated even after other portions of the electronic document are presented at the user device 106. Also, as the delay in providing third-party content to the user device 106 increases, it is more likely that the electronic document will no longer be presented at the user device 106 when the third-party content, thereby negatively impacting a user's experience with the electronic document. Further, delays in providing the third-party content can result in a failed delivery of the third-party content, for example, if the electronic document is no longer presented at the user device 106 when the third-party content is provided.

In some implementations, the third-party content distribution system 110 is implemented in a distributed computing system that includes, for example, a server and a set of multiple computing devices 114 that are interconnected and identify and distribute third-party content in response to requests 112. The set of multiple computing devices 114 operate together to identify a set of third-party content that are eligible to be presented in the electronic document from among a corpus of millions of available third-party content (3PC1-x). The millions of available third-party content can be indexed, for example, in a third-party corpus database 116. Each third-party content index entry can reference the corresponding third-party content and/or include distribution parameters (DP1-DPx) (e.g. selection criteria) that condition the distribution of the corresponding third-party content.

In some implementations, the distribution parameters (e.g., selection criteria) for a particular third-party content can include distribution keywords that must be matched (e.g., by electronic documents or terms specified in the request 112) in order for the third-party content to be eligible for presentation. The distribution parameters can also require that the request 112 include information specifying a particular geographic region (e.g., country or state) and/or information specifying that the request 112 originated at a particular type of user device (e.g., mobile device or tablet device) in order for the third-party content to be eligible for presentation. The distribution parameters can also specify a selection value (e.g., bid) and/or budget for distributing the particular third-party content.

The identification of the eligible third-party content can be segmented into multiple tasks 117a-117c that are then assigned among computing devices within the set of multiple computing devices 114. For example, different computing devices in the set of multiple computing devices 114 can each analyze a different portion of the third-party corpus database 116 to identify various third-party content having distribution parameters that match information included in the request 112. In some implementations, each given computing device in the set of multiple computing devices 114 can analyze a different data dimension (or set of dimensions) and pass results 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more instances of third-party content that will be provided in response to the request 112. For example, the third-party content distribution system 110 can select a set of winning third-party content based on the outcome of one or more content evaluation processes, as discussed in further detail below. In turn, the third-party content distribution system 110 can generate and transmit, over the network 102, reply data 120 (e.g., digital data representing a reply) that enable the user device 106 to integrate the set of winning third-party content into the given electronic document, such that the set of winning third-party content and the content of the electronic document are presented together at a display of the user device 106.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request 121 to the third-party content server 108 to obtain a given winning third-party content from the third-party content server 108. In response to the request, the third-party content server 108 will transmit, to the user device 106, third-party data 122 that causes the given winning third-party content to be incorporated into the electronic document and presented at the user device 106.

The third-party content distribution system 110 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting.

In some implementations, the third-party content distribution system 110 may select winning third-party content in response to a given request from among a set of third-party content items (e.g., instances of third-party content) that have been deemed eligible to return to the user device 106 in response to that request. Eligible third-party content can be identified on a per-request basis according to various data specified in the request, or context associated with the request. For example, the request may indicate a permissible size or aspect ratio of the requested third-party content, and the third-party content distribution system 110 may filter the total set of available third-party content to a set of eligible content that satisfies the size or aspect ratio constraint, and any other applicable constraints. The evaluation process for selecting winning third-party content can then be performed only with respect to the set of eligible third-party content. In some examples, the evaluation process may involve scoring and ranking third-party content items. The winning third-party content item may be the highest-ranked item according to the scores. In some implementations, the ineligible third-party content may be excluded from the total set of available content before the content is scored and ranked. In some implementations, the ineligible third-party content may be excluded from the total set of available content after the content is scored and ranked.

As described further with respect to FIGS. 2-5B, the third-party content distribution system 110 may be configured to trigger presentation of information related to applications. For example, the third-party content distribution system 110 can receive (or receive notification of) an opportunity to provide third-party content to a user, such as receiving a submitted query or a request to fill a third-party content slot. In response, the third-party content distribution system 110 can provide application information associated with an app, such as for a link to download the application.

Figure 2:
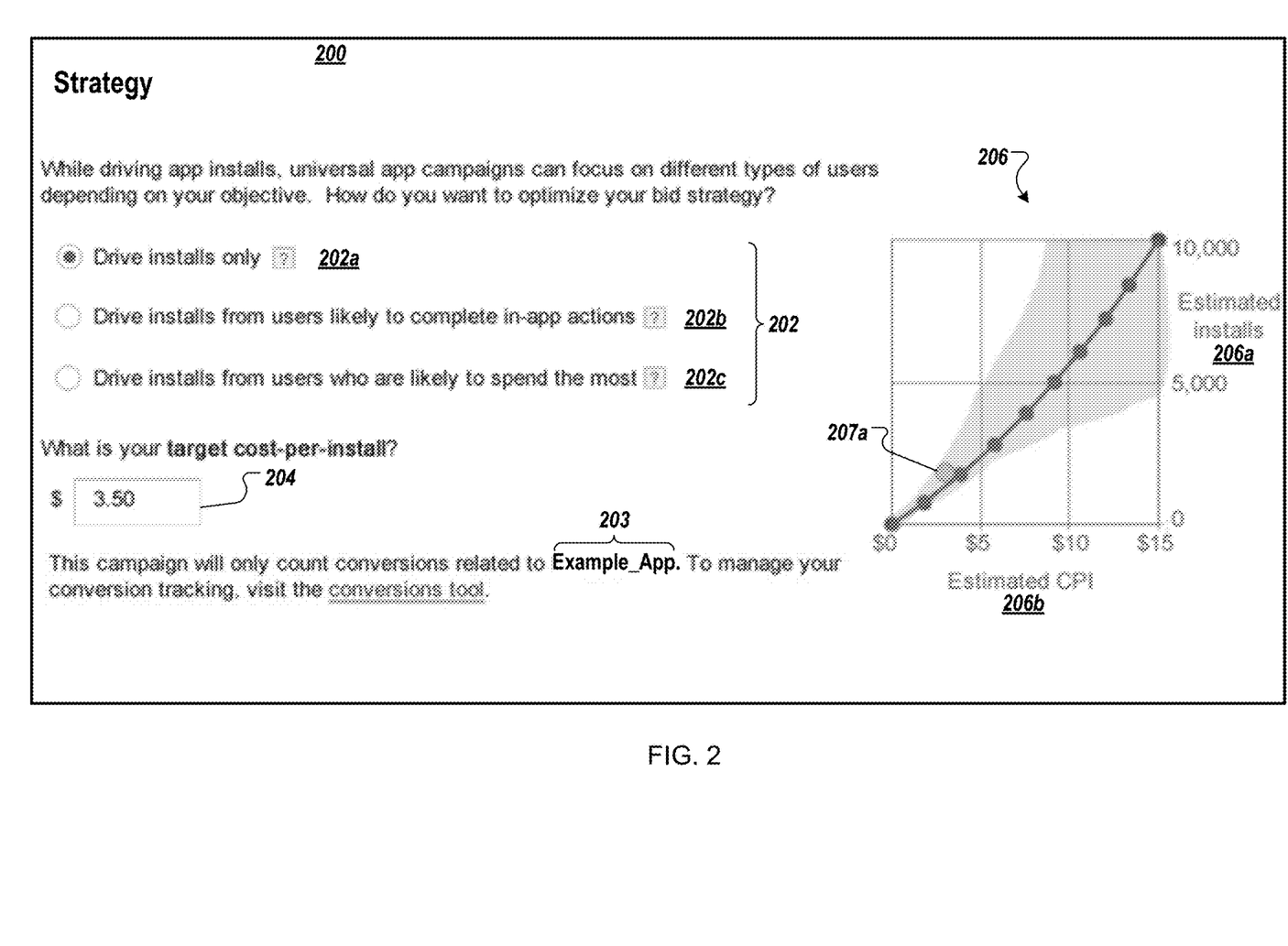
FIGS. 2-4 collectively show an example user interface for application providers to provide bid strategies for the selection of content related to their applications.
Figure 3:
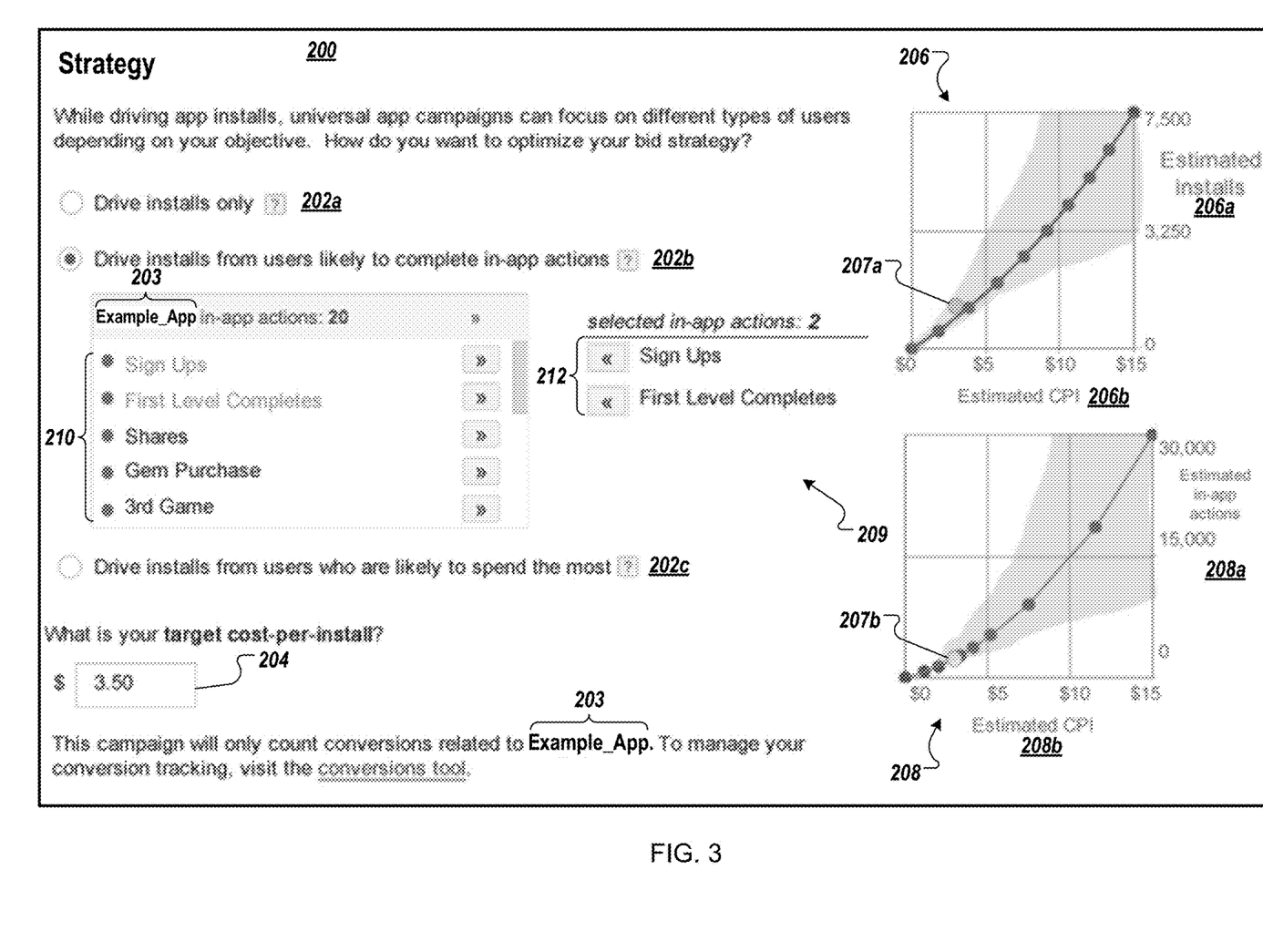
Figure 4:
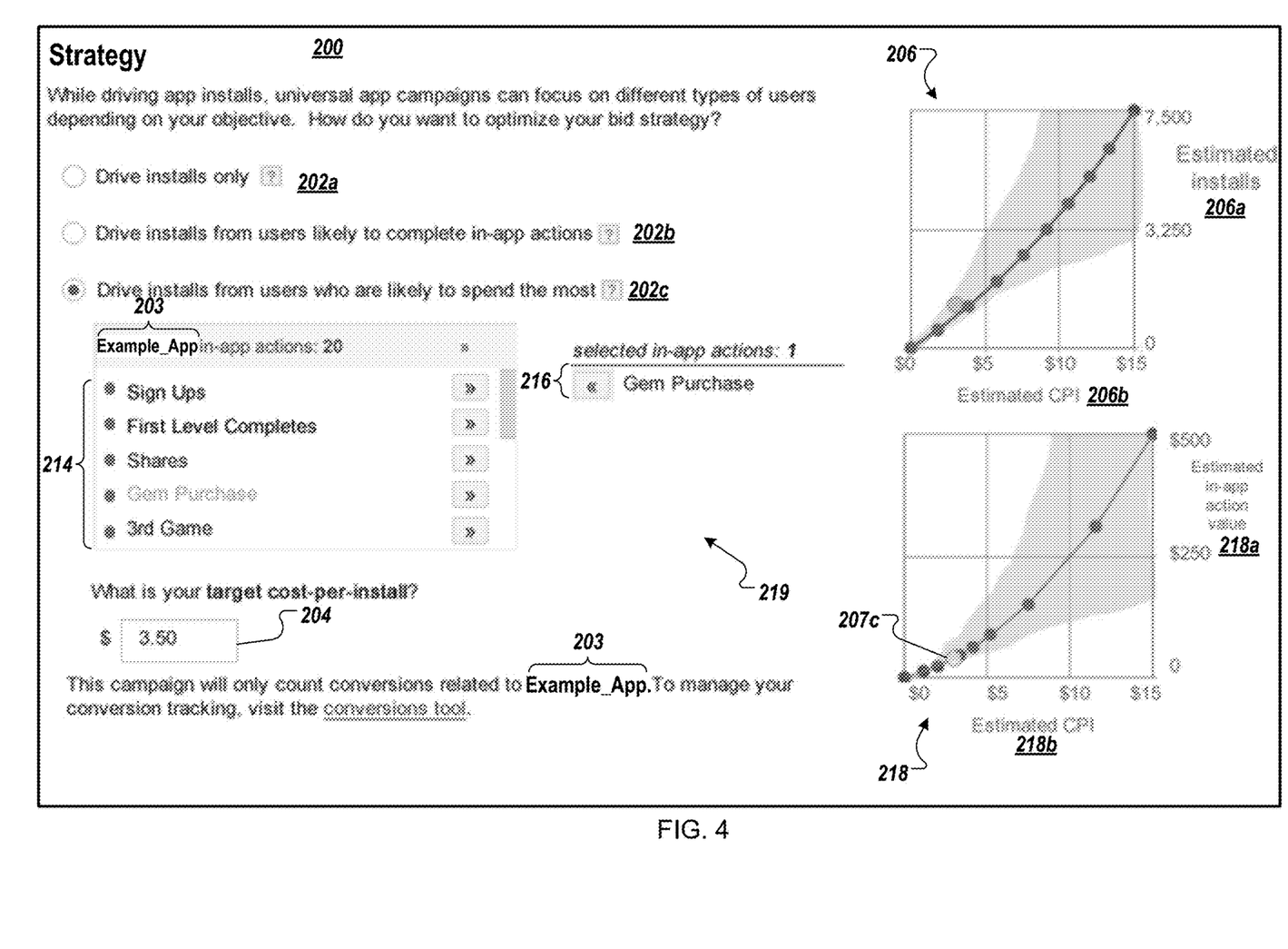

FIGS. 2-4 collectively show an example user interface 200 for application providers to specify strategies for distribution of content related to their applications. For example, using the user interface 200, application providers 126 can identify post-install activities that are to be used for optimizing the selection of third-party content related to their applications. For example, the application provider can specify that they want information about their application provided to users who will perform one or more of the specified post-install activities.

When presented to an application provider 126, for example, the user interface 200 can be populated with a set of post-install activities 202 that the application provider is currently tracking (e.g., using an analytics system). The tracking of the post-install activities can be achieved, for example, by the app provider inserting a specific piece of code at a given location within their application, such that when the post-install activity is performed, the code will be executed by the user device and submit information to a tracking server indicating that the specified post-install activity was performed within the application. The user interface 200 can receive (through inputs by the application provider) data specifying post-install activities, such as through application provider interactions with one or more of the set of post-install activities 202 presented in the user interface 200.

The user interface 200 can be used by an application provider 126, for example, to set content selection parameters for optimizing (e.g., maximizing or increasing) total conversion volume for an application provided by the application provider 126. For example, the user interface 200 can support a selection value landscape in which selection values and corresponding numbers of installs (or post install actions) are shown as a function of cost-per-install. In some implementations, the user interface 200 can be used by the application provider 126 advertiser to select a target cost per impression (CPI).

In some implementations, the user interface 200 can include features by which the application provider 126 can submit an input associated with a lifetime value of a user. For example, the lifetime value of a user may be the total amount of revenue generated from a user who downloads an application and subsequently uses the application. In some implementations, the user interface 200 can allow the application provider 126 to specify thresholds (e.g., minimums) to compare, for example, with estimates of lifetime values of users in order to change selection value amounts. In some implementations, different selection value amounts can be associated with different ranges of lifetime values of a customer. In some implementations, different selection value amounts can be associated with a rate of gain (e.g., $X of revenue over N months) or a return on investment (ROI). For example, the selection value can increase as the rate of gain increases (e.g., such that a higher selection value will be used when a higher level of revenue is expected).

For example, application provider 126 can choose to optimize content selection for post-install user interactions with the application as the goal and then proceed to select the categories (or types) of post-install user interactions the application provider is interested in driving. In some implementations, for post-install user interaction optimization, application providers can be recommended to select certain user interactions (e.g., first opening of the application) that the application provider is currently tracking. Depending on the post-install user interactions chosen, a different selection value landscape can be presented, thereby providing an interactive visualization of how many of the specified post-install user interactions can be achieved at various different selection value levels.

In some implementations, the application provider can choose to distribute information about the application to optimize installs only by interacting, for example, with a post-install activity option 202a (e.g., "Drive installs only"). Alternatively, or additionally, the application provider can choose to distribute information about the application in a manner that optimizes post-install activity by interacting with one of the post-install activity options 202b, 202c. For example, the application provider 126 using the user interface 200 can select one of the post-install activity options 202b or 202c, depending on the strategy that the application provider 126 wants to use for the selection of third-party content that includes information about a particular application (e.g., Example_App 203). Post-install activity option 202b can be selected when the selection value strategy is to use a target cost-per-install 204 to drive installs from users who are likely to complete specified in-app actions. Post-install activity option 202c can be selected when the selection value strategy is to use the target cost-per-install 204 to drive installs from users who are likely to provide the highest gain (e.g., spend the most). In some implementations, a graph 206 can show estimated installs 206a relative to an estimated cost-per-install (CPI) 206b. A data point 207a, for example, can identify a position on the graph 206 associated with the current settings within the post-install activity option 202a.

Referring now to FIG. 3, when post-install activity option 202b is selected, for example, controls 209 are presented that are used to specify post-install user interactions 210 to optimize. For example, the post-install user interactions 210 can include in-app actions that can occur (and are specific to) Example_App 203 after the app is installed, such as sign ups (e.g., creation of a user name and password), first-level completes (e.g., completion of a first level of a game or other application), shares in a social network, an in-app purchase of gems (or other items), and third game acquisition. Other apps (e.g., different from Example_App 203) may have a different list of post-install user interactions 210, including none, some or all of the list of post-install user interactions 210 applicable to Example_App 203. Selected user interactions 212, for example, can identify which ones of the post-install user interactions 210 are currently selected, e.g., sign ups and first-level completes. At this time, based on the selected user interactions 212, the application provider 126 is indicating, through the user interface 200, that the selection value strategy for the Example_App 203 is to drive selection values for users receiving the Example_App 203 based on their likelihood of performing sign ups and first level completes. In some implementations, a graph 208 can show estimated in-app actions 208a relative to an estimated cost-per-install (CPI) 208b. A data point 207b identifies a position on the graph 208 associated with the current settings within the post-install activity option 202b.

Referring now to FIG. 4, when post-install activity option 202c is selected, for example, controls 219 are presented that are associated with user interactions 214. For example, the user interactions 214 can include spend-related in-app actions that can occur (and are specific to) Example_App 203 after the app is installed, such as sign ups, first-level completes, shares, a gem purchase, and third game acquisition. Other apps (e.g., different from Example_App 203) may have a different list of user interactions 214, including none, some or all of the list of user interactions 214 applicable to Example_App 203. Selected user interactions 216, for example, can identify which ones of the user interactions 214 are currently selected, e.g., the gem purchase. Based on the selected user interactions 216, the application provider 126 is indicating that the selection value strategy for the Example_App 203 is to distribute information about the Example_App 203 to users based on their likelihood of spending the most acquiring gems in the application. In some implementations, a graph 218 can show an estimated in-app actions value 218a relative to an estimated cost-per-install (CPI) 218b. A data point 207c, for example, can identify a position on the graph 218 associated with the current settings within the post-install activity option 202c.

Figure 5A:
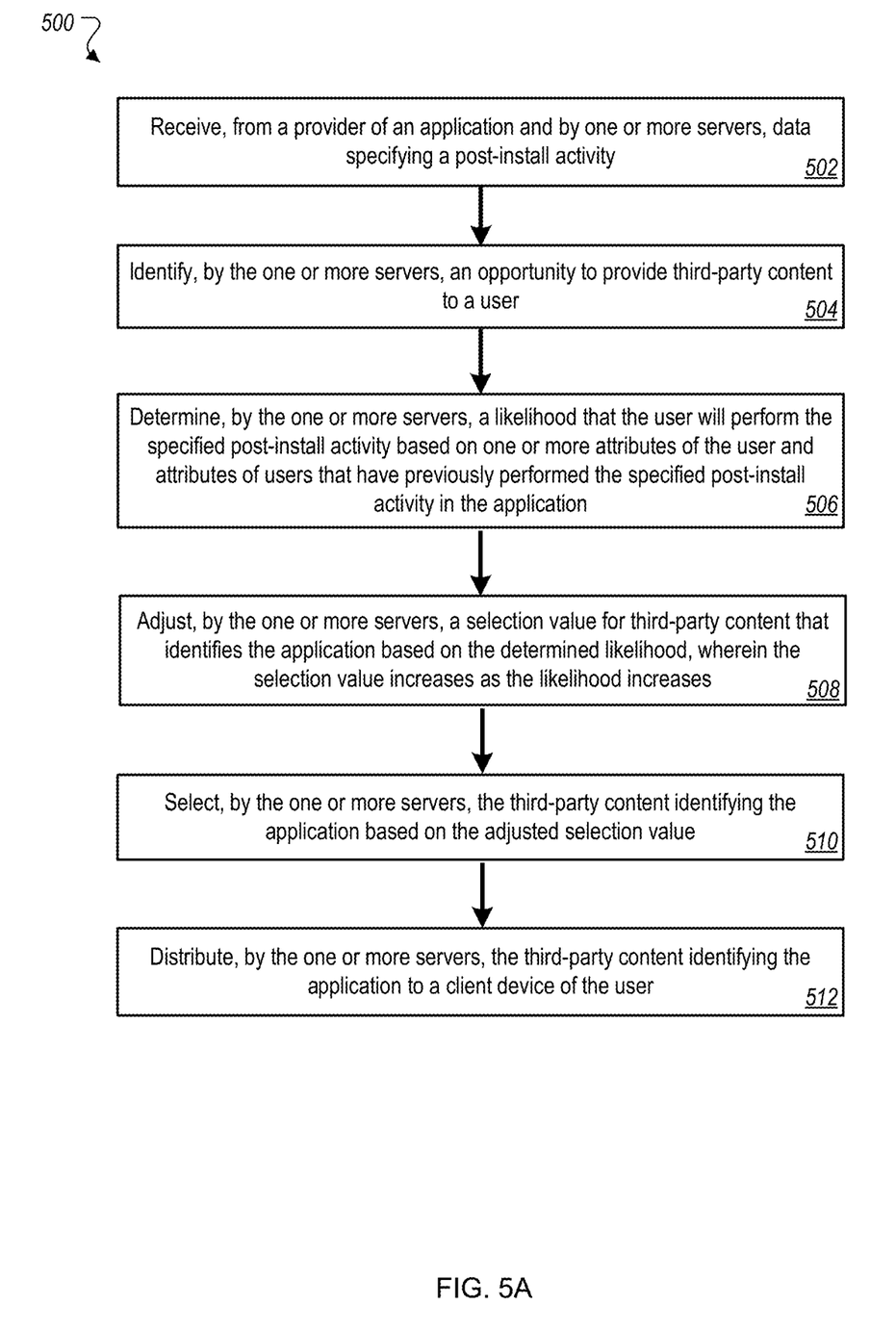
FIG. 5A is a flowchart of an example process for distributing third-party content.

FIG. 5A is a flowchart of an example process 500 for distributing third-party content. In some implementations, the third-party content distribution system 110 and components that it includes can perform steps of the process 500 using one or more servers and a memory device storing instructions that are executed by one or more processors. FIGS. 1-4 and 5B are used to provide example structures for performing the steps of the process 500. For example, stages 1-6 in FIG. 5B track to steps 502-512, respectively.

Data specifying a post-install activity is received from a provider of an application and by one or more servers (502). As an example, the 110 can receive (e.g., at stage 1 in FIG. 5B) data specifying a post-install activity 520. Receipt of the data can occur, for example, when the application provider 126 uses the user interface 200 to specify one of the post-install activities 202 to be used as a selection value strategy for distributing content about an application of the application provider 126. If the application provider 126 selects post-install activity option 202b, for example, then the application provider 126 can select specific ones of the post-install user interactions 210 for which the target cost-per-install 204 is to be applied. In some implementations, information associated with the data specifying the post-install activity 520 can be stored in a data store of universal application campaigns 536 that allow, for example, the application provider 126 to specify a single campaign including a single set of content selection parameters to be used across all existing advertisement networks/platforms. A data store of applications 538, for example, can include the Example_App 203 of the application provider 126, as well as applications for the same and different application providers 126.

An opportunity is identified to provide third-party content to a user (504). For example, the third-party content distribution system 110 can receive a request for content 522, e.g., from a user device 106a associated with a user 524. The request for content 522 (e.g., at stage 2 in FIG. 5B) can be, for example, a search query or a request for content to fill a third-party content slot of a resource (e.g., streaming media, a web page, a social network page, or in a native application executing at the user device) presented at the user device 106a. In some implementations, the opportunity that is identified can be an opportunity to provide a content item from third-party content 534, which can include, for example, information about applications, including, for example, a link that initiates a download of the application or links to an application download site.

A likelihood is determined that the user will perform the specified post-install activity based on one or more attributes of the user and attributes of users that have previously performed the specified post-install activity in the application (506). A content selection engine 526, for example, can determine (e.g., at stage 3 in FIG. 5B) a likelihood 528 that the user will perform the specified post-install activity, such as one of the post-install activities that the application provider 126 has specified on the user interface 200. The likelihood that the user will perform the specified post-install activity can be determined by applying a model generated by a machine learning system to attributes of the user. The one or more attributes of the user can include, for example, an operating system executing on the user device, a version of the operating system and/or user device, a geographic region from which the request for content was received (e.g., a geo-location of the user device), and/or a type of user device from which the request for content was submitted.

Figure 5B:
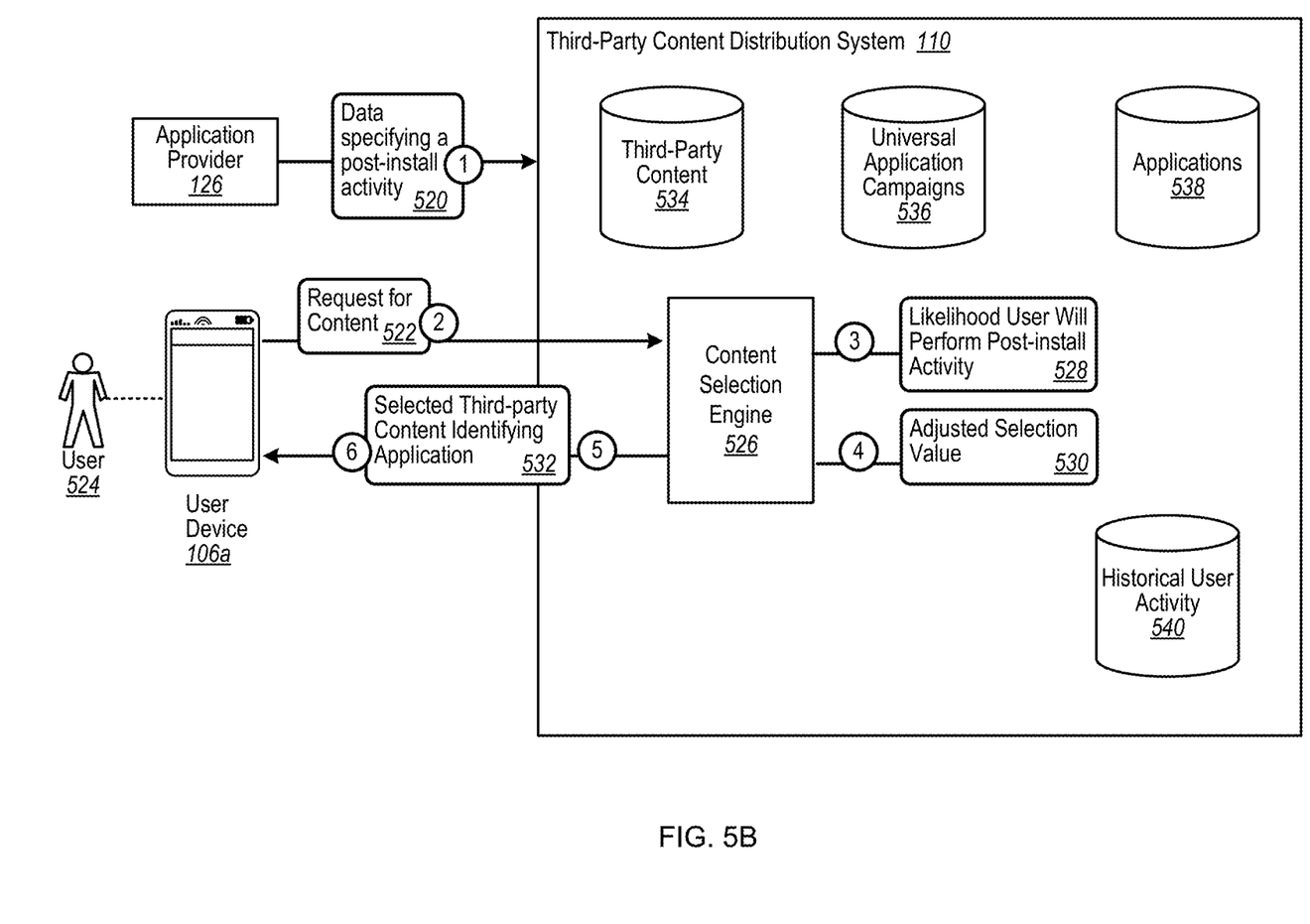
FIG. 5B shows an example system that distributes third-party content.

The model generated by the machine learning system can take, as input, information about (e.g., attributes of) users who performed the specified post-install activity in the past, and generate a model that predicts whether a user will perform the specified post-install activity based on the input. The model can specify, for example, the importance (e.g., weight) of each of the attributes in predicting whether a user will perform the specified post-install activity. The model (and the importance of the various attributes) can be generated, for example, using linear regression, or another machine learning technique.

A selection value for third-party content that identifies (e.g., included information about) the application is adjusted based on the determined likelihood (508). In some implementations, the selection value increases as the likelihood increases. For example, based on the selection value strategy and settings provided by the application provider 126 in the user interface 200, such as in post-install activity options 202b and 202c, the content selection engine 526 can provide (e.g., at stage 4 in FIG. 5B) an adjusted selection value 530, such as to raise the selection value (e.g., in an auction) for one or more content items associated with Example_App 203. The raised selection value can be in lines with the target cost-per-install 204, e.g., so that on average the specified target cost-per-install 204 is achieved.

The third-party content identifying the application is selected based on the adjusted selection value (510). As an example, the content selection engine 526 can select (e.g., at stage 5 in FIG. 5B) selected third-party content 532 identifying the application.

The third-party content identifying the application is distributed to a client device of the user (512). For example, the third-party content distribution system 110 can provide (e.g., at stage 6 in FIG. 5B) third-party content 532 identifying the application in response to the request for content 522.

In some implementations, receiving data specifying a post-install activity comprises receiving data specifying one or more user interactions with the application that are capable of being performed. For example, in addition to specifying the post-install activity options 202b or 202c, the application provider 126 can select particular ones of the user interactions 210 or 214, respectfully. In this case, specifying particular ones of the user interactions 210 or 214 indicates the particular user interactions for which the application provider 126 is willing to increase a selection value in line with the target cost-per-install 204.

In some implementations, receiving data specifying a post-install activity comprises receiving data specifying a target level of gain to be obtained following install of the application, e.g. the level of gain being defined by one or more of or spend a user and profit, such as a lifetime profit or a profit for some other time period that is related to a value provided by having the user 524 as a customer. For example, the user interface 200 can include one or more features that allow the application provider 126 to identify a threshold lifetime value threshold, value-to-cost threshold, or some other value associated with a likelihood that the user will achieve after downloading an app (e.g., Example_App 203).

In some implementations, determining the likelihood that the user will perform the specified post-install activity can include the following. Historical user activity data, e.g., accessed from a data store of historical user activity 540, is accessed that specifies prior user activity within the application. User attributes of users that performed the specified post-install activity are accessed, e.g., by analyzing past user activity, including user interactions, before and after installs of applications. A model is generated that provides a likelihood the user will perform the specified post-install activity after install of the application by the user. The model is applied to the one or more attributes of the user to obtain the likelihood. For example, the content selection engine 526 can use the generated model to determine a likelihood that the user 524 will perform the user interaction(s) specified in the selection value strategy for the application. As a result, machine learning systems can be used so as to predict, for a given query (e.g., for generating an ad), user, and app combination, a likelihood of the user installing the app and performing a post-install activity. The machine learning system can also similarly generate a model that outputs an estimated post-install lifetime value of a given user based on lifetime values of users having similar attributes as the given user.

In some implementations, determining the likelihood that the user will perform the specified post-install activity includes the following. Historical user activity data is accessed that specifies prior gain obtained through interaction within the application. User attributes of users that interacted with the application are accessed. A model is generated that provides an estimated gain that will be obtained from the user through interaction with the application after install of the application by the user. The model is applied to the one or more attributes of the user to obtain the estimated gain that will be obtained from the user. For example, the content selection engine 526 can also determine information associated with financial gain that is likely to occur for particular users or groups of users, and the information can be used when adjusting selection values for content items associated with applications.

Figure 6:
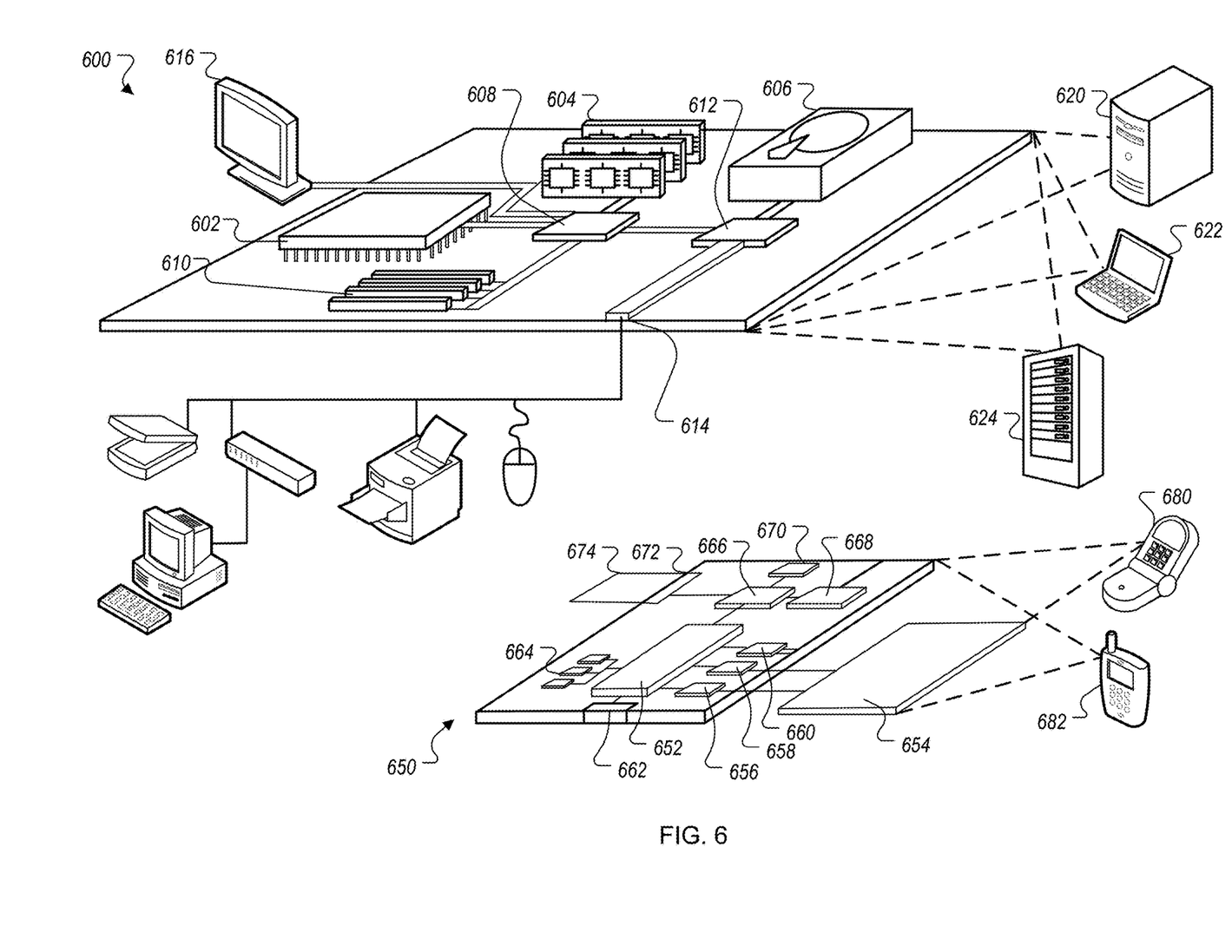
FIG. 6 is a block diagram of an example computer system that can be used to implement the methods, systems and processes described in this disclosure.

FIG. 6 is a block diagram of example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processors embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provide as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, comprising:
receiving, from a provider of an application and by one or more servers, data specifying a target post-install activity performable by a user after the user installs the application, wherein the provider specifies, through interaction with a user interface, that the post-install activity includes user sign-up process, the user reaching a specified level of a game application after the user installs the application, sharing in a social network, and an in-app purchase of game items;
identifying, by the one or more servers, an opportunity to provide a particular third-party content that identifiers the application to the user prior to the user installing the application;
identifying one or more distribution parameters that specify a selection value for distributing the particular third-party content;
identifying, by the one or more servers and based on the data specifying the post-install activity, attributes of different users, other than the user, that have previously performed the specified post-install activity in the application based on past user activity;
identifying, by the one or more servers, a match between (i) one or more identified attributes of the user and (ii) the identified attributes of the different users that have previously performed the specified post-install activity in the application;
determining, by the one or more servers, prior to the user installing the application, and based on the identified match between the one or more identified attributes of the user and the identified attributes of the other users, a likelihood that the user will perform the specified post install activity after installing the application:
adjusting, by the one or more servers, the selection value for the particular third-party content that identifies the application based on the determined likelihood that the user will perform the specified post-install activity after installing the application, wherein the selection value increases as the likelihood increases;
selecting, by the one or more servers, the particular third-party content identifying the application based on the adjusted selection value; and
distributing, by the one or more servers, the particular third-party content identifying the application to a client device of the user.

2. The method of claim 1, wherein receiving data specifying the postinstall activity comprises receiving data specifying a target level of gain, including one of a spend level or a profit level, to be obtained following install of the application.

3. The method of claim 1, wherein determining the likelihood that the user will perform the specified post-install activity comprises:
accessing historical user activity data specifying prior user activity within the application; accessing user attributes of users that performed the specified post-install activity; generating a model that provides the likelihood the user will perform the specified postinstall activity after install of the application by the user: and
applying the model to the one or more attributes of the user to obtain the likelihood.

4. The method of claim 3, wherein determining the likelihood that the user will perform the specified post-install activity comprises:
accessing historical user activity data specifying prior gain obtained through interaction within the application;
accessing user attributes of users that interacted with the application; generating a model that provides an estimated gain that will be obtained from the user through interaction with the application after install of the application by the user; and
applying the model to the one or more attributes of the user to obtain the estimated gain that will be obtained from the user.

5. The method of claim 1, further comprising:
providing, to the provider, a user interface that is populated with a set of post-install activities that the provider is tracking, wherein receiving data specifying a post-install activity comprises detecting provider interaction with one or more of the set of post-install activities presented in the user interface.

6. A non-transitory computer program product embodied in a non-transitory computer-readable medium including instructions, that when executed, cause one or more processors to perform operations including:

receiving, from a provider of an application data specifying a target post-install activity performable by a user after the user installs the application, wherein the provider specifies, through interaction with a user interface, that the post-install activity includes user sign-process, the user reaching a specified level of a game application after the user installs the application, sharing in a social network, and an in-app purchase of game items;

identifying an opportunity to provide a particular third-party content that identifiers the application to the user prior to the user installing the application:

identifying one or more distribution parameters that specify a selection value for distributing the particular third-party content;

identifying, based on the data specifying the post-install activity, attributes of different users, other than the user, that have previously performed the specified post-install activity in the application based on past user activity;

identifying a match between (i) one or more identified attributes of the user and (ii) the identified attributes of the different users that have previously performed the specified post-install activity in the application;

determining, prior to the user installing the application, and based on the identified match between the one or more identified attributes of the user and the identified attributes of the other users, a likelihood that the user will perform the specified postinstall activity after installing the application;

adjusting the selection value for the particular third-party content that identifies the application based on the determined likelihood that the user will perform the specified post-install activity after installing the application, wherein the selection value increases as the likelihood increases;

selecting the particular third-party content identifying the application based on the adjusted selection value; and distributing the particular third-party content identifying the application to a client device of the user.

7. The non-transitory computer program product of claim 6, wherein receiving data specifying the post-install activity comprises receiving data specifying a target level of gain, including one of a spend level or a profit level, to be obtained following install of the application.

8. The non-transitory computer program product of claim 6, wherein determining the likelihood that the user will perform the specified post-install activity comprises:

accessing historical user activity data specifying prior user activity within the application; accessing user attributes of users that performed the specified post-install activity; generating a model that provides the likelihood the user will perform the specified post-install activity after install of the application by the user: and applying the model to the one or more attributes of the user to obtain the likelihood.

9. The non-transitory computer program product of claim 8, wherein determining the likelihood that the user will perform the specified post-install activity comprises:

accessing historical user activity data specifying prior gain obtained through interaction within the application;

accessing user attributes of users that interacted with the application; generating a model that provides an estimated gain that will be obtained from the user through interaction with the application after install of the application by the user: and applying the model to the one or more attributes of the user to obtain the estimated gain that will be obtained from the user.

10. The non-transitory computer program product of claim 6, the operations further comprising:

providing, to the provider, a user interface that is populated with a set of post-install activities that the provider is tracking, wherein receiving data specifying a post-install activity comprises detecting provider interaction with one or more of the set of post-install activities presented in the user interface.

11. A system comprising: one or more processors; and one or more memory elements including instructions that, when executed, cause the one or more processors to perform operations including:

receiving, from a provider of an application, data specifying a target post-install activity performable by a user after the user installs the application, wherein the provider specifies, through interaction with a user interface, that the post-install activity includes user sign-process, the user reaching a specified level of a game application after the user installs the application, sharing in a social network, and an in-app purchase of game items;

identifying an opportunity to provide a particular third-party content that identifiers the application to the user prior to the user installing the application;

identifying one or more distribution parameters that specify a selection value for distributing the particular third-party content;

identifying, based on the data specifying the postinstall activity, attributes of different users, other than the user, that have previously performed the specified post-install activity in the application based on past user activity;

identifying a match between (i) one or more identified attributes of the user and (ii) the identified attributes of the different users that have previously performed the specified post-install activity in the application;

determining, prior to the user installing the application, and based on the identified match between the one or more identified attributes of the user and the identified attributes of the other users, a likelihood that the user will perform the specified post-install activity after installing the application;

adjusting the selection value for the particular third-party content that identifies the application based on the determined likelihood that the user will perform the specified post-install activity after installing the application, wherein the selection value increases as the likelihood increases;

selecting the particular third-party content identifying the application based on the adjusted selection value; and distributing the particular third-party content identifying the application to a client device of the user.

12. The system of claim 11, wherein receiving data specifying the postinstall activity comprises receiving data specifying a target level of gain, including one of a spend level or a profit level, to be obtained following install of the application.

13. The system of claim 11, wherein determining the likelihood that the user will perform the specified post-install activity comprises:

accessing historical user activity data specifying prior user activity within the application; accessing user attributes of users that performed the specified post-install activity; generating a model that provides the likelihood the user will perform the specified postinstall activity after install of the application by the user; and applying the model to the one or more attributes of the user to obtain the likelihood.

14. The system of claim 13, wherein determining the likelihood that the user will perform the specified post-install activity comprises:

accessing historical user activity data specifying prior gain obtained through interaction within the application;

accessing user attributes of users that interacted with the application; generating a model that provides an estimated gain that will be obtained from the user through interaction with the application after install of the application by the user; and applying the model to the one or more attributes of the user to obtain the estimated gain that will be obtained from the user.

15. The system of claim 11, the operations further comprising:

providing, to the provider, a user interface that is populated with a set of post-install activities that the provider is tracking, wherein receiving data specifying a post-install activity comprises detecting provider interaction with one or more of the set of post-install activities presented in the user interface.

* * * * *